(12) United States Patent
Yang et al.

(10) Patent No.: US 12,424,924 B2
(45) Date of Patent: Sep. 23, 2025

(54) ALTERNATING CURRENT CONTROL SYSTEM

(71) Applicant: NIKO SEMICONDUCTOR CO., LTD., New Taipei (TW)

(72) Inventors: Hui-Chiang Yang, Taipei Hsien (TW); Chia-Chang Lin, New Taipei (TW)

(73) Assignee: NIKO SEMICONDUCTOR CO., LTD., New Taipei (TW)

( * ) Notice: Subject to any disclaimer, the term of this patent is extended or adjusted under 35 U.S.C. 154(b) by 326 days.

(21) Appl. No.: 18/184,793

(22) Filed: Mar. 16, 2023

(65) Prior Publication Data

US 2024/0178745 A1 May 30, 2024

(30) Foreign Application Priority Data

Nov. 24, 2022 (TW) .................................. 111144901

(51) Int. Cl.
*H02M 1/08* (2006.01)
*H02M 1/36* (2007.01)

(52) U.S. Cl.
CPC ............. *H02M 1/083* (2013.01); *H02M 1/36* (2013.01)

(58) Field of Classification Search
CPC ................................ H02M 1/083; H02M 1/36
See application file for complete search history.

(56) References Cited

U.S. PATENT DOCUMENTS

| | | | |
|---|---|---|---|
| 6,347,028 B1 * | 2/2002 | Hausman, Jr. ....... | H05B 39/045 323/276 |
| 8,446,050 B2 | 5/2013 | Klapatch | |
| 9,452,437 B2 | 9/2016 | Osawa et al. | |

(Continued)

FOREIGN PATENT DOCUMENTS

| | | | |
|---|---|---|---|
| CN | 202696579 U | | 1/2013 |
| CN | 216718951 U | | 6/2022 |
| CN | 217508348 | * | 9/2022 |
| CN | 217508348 U | * | 9/2022 |
| DE | 102020121643 | * | 2/2022 |

(Continued)

OTHER PUBLICATIONS

Yongdong Wu, Binbin Chen, Jian Weng, Zhuo Wei, Xin Li, Bo Qiu, and Niekie Liu, "False Load Attack to Smart Meters by Synchronously Switching Power Circuits", IEEE Transactions on Smart Grid, Feb. 16, 2018, pp. 2641-2649.

*Primary Examiner* — Sean Kayes
*Assistant Examiner* — Jonathan Walter Soileau
(74) *Attorney, Agent, or Firm* — Li & Cai Intellectual Property (USA) Office

(57) ABSTRACT

An alternating current control system includes a zero crossing detector, an alternating current solid state relay, a constant current driver, and a microcontroller connected to the zero crossing detector and the constant current driver. The zero crossing detector and the alternating current solid state relay are connected to an alternating current power source, a first control pin of the microcontroller receives a zero crossing detection signal outputted by the zero crossing detector, a second control pin of the microcontroller receives a switch state signal, and a third control pin of the microcontroller is connected to the constant current driver and outputs a control signal. Based on the switch state signal and the zero crossing detection signal, the microcontroller adjusts a level of the control signal and controls an electrical connection between the alternating current solid state relay and the alternating current power source.

7 Claims, 13 Drawing Sheets

(56) References Cited

U.S. PATENT DOCUMENTS

| | | |
|---|---|---|
| 10,491,135 B1 | 11/2019 | Chmielus |
| 10,879,878 B1 * | 12/2020 | Hinnen .................. H02M 7/06 |
| 2008/0309379 A1 | 12/2008 | Carroll |
| 2017/0203850 A1 * | 7/2017 | Wang ........................ H02J 7/34 |
| 2021/0096185 A1 * | 4/2021 | Adkins ................ H01H 47/002 |
| 2022/0357787 A1 * | 11/2022 | Lee ........................ H04L 12/10 |

FOREIGN PATENT DOCUMENTS

| | | | | |
|---|---|---|---|---|
| DE | 102020121643 A1 * | 2/2022 | ........... | G01R 19/175 |
| JP | 2017188978 | * 10/2017 | | |
| JP | 2017188978 A | * 10/2017 | | |

* cited by examiner

ALTERNATING CURRENT CONTROL SYSTEM

CROSS-REFERENCE TO RELATED PATENT APPLICATION

This application claims the benefit of priority to Taiwan Patent Application No. 111144901, filed on Nov. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an alternating current control system, and more particularly to an alternating current control system using a relay.

BACKGROUND OF THE DISCLOSURE

Currently, two types of alternating current solid state relay (AC-SSR) are most commonly seen on the market. The first type is a photo-triac driver. Although the photo-triac driver can detect a zero crossing point of an alternating current signal and has a small inrush current, a certain amount of energy electromagnetic interference noise can be generated. Further, the photo-triac driver is likely to generate heat when in use.

The second type of the alternating current solid state relay uses a power transistor, and does not easily generate heat when in use. However, the second type of the alternating current solid state relay cannot detect the zero crossing point of the alternating current signal, and may generate a large current and a large electromagnetic interference noise when being activated, thereby damaging the power transistor.

SUMMARY OF THE DISCLOSURE

In response to the above-referenced technical inadequacies, the present disclosure provides an alternating current control system.

In order to solve the above-mentioned problems, one of the technical aspects adopted by the present disclosure is to provide an alternating current control system. The alternating current control system is adapted to an alternating current power source, and includes a zero crossing detector, a microcontroller, a constant current driver, and an alternating current solid state relay. The zero crossing detector includes an alternating current signal processing circuit and an optocoupler. The alternating current signal processing circuit is electrically connected to the alternating current power source, and the optocoupler is electrically connected to the alternating current signal processing circuit and outputs a zero crossing detection signal. The microcontroller includes a first control pin, a second control pin, and a third control pin. The first control pin is electrically connected to the optocoupler for receiving the zero crossing detection signal, the second control pin receives a switch state signal, and the third control pin outputs a control signal. The constant current driver is electrically connected to the third control pin for receiving the control signal. The alternating current solid state relay is electrically connected between the constant current driver and the alternating current power source. Based on the switch state signal and the zero crossing detection signal, the microcontroller adjusts a level of the control signal and controls an electrical connection between the alternating current power source and the alternating current solid state relay.

Therefore, the alternating current control system provided by the present disclosure can not only accurately detect a zero crossing point of an alternating current signal but also activate or deactivate the electrical connection between the alternating current solid state relay and the alternating current power source based on a level of the switch state signal and a level of the zero crossing detection signal. In this way, when the electrical connection between the alternating current solid state relay and the alternating current power source is activated or deactivated, a large current and a large electromagnetic interference noise will not be easily generated. Further, a power transistor of the alternating current solid state relay is not easily damaged.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
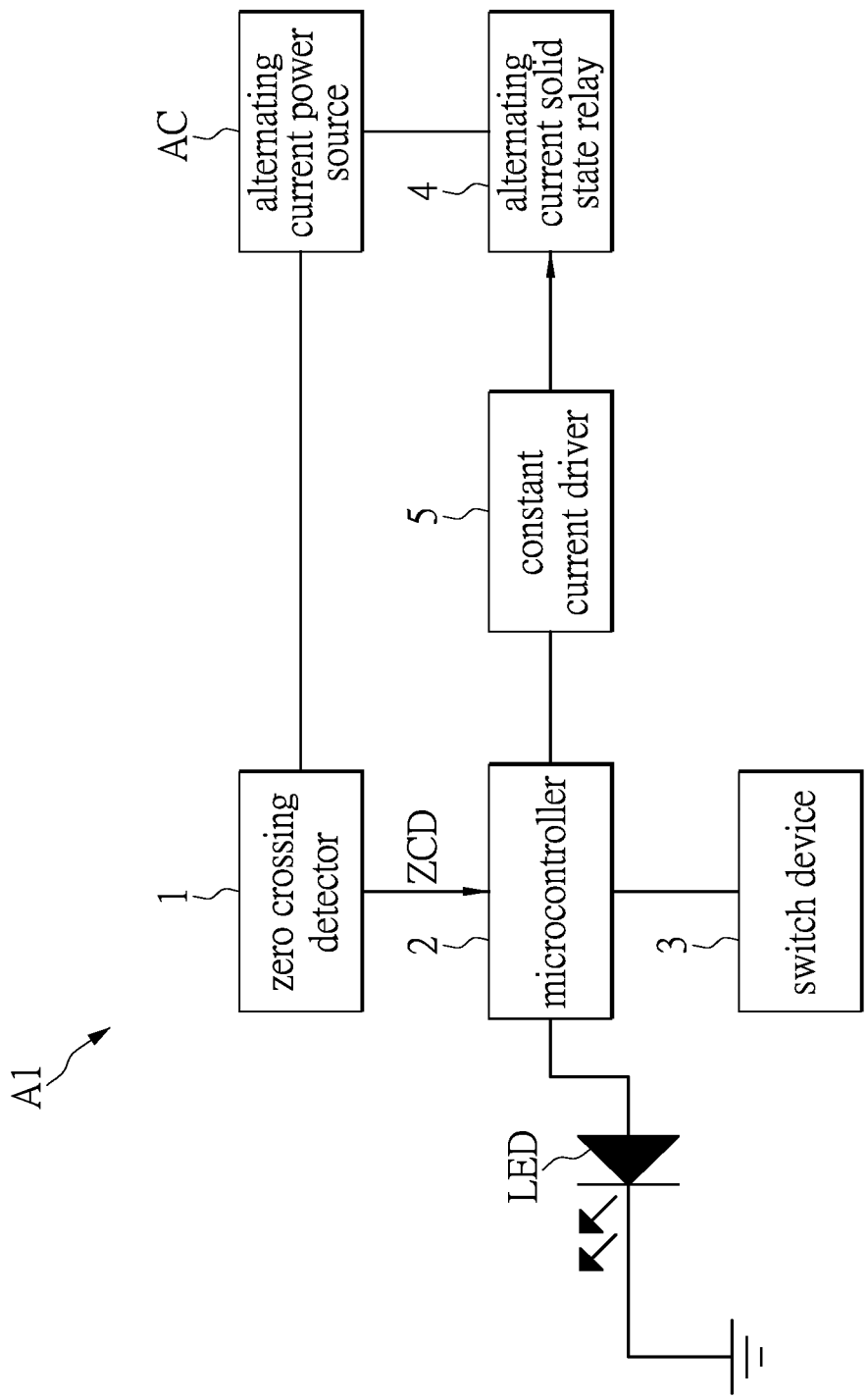
FIG. 1 is a schematic view of an alternating current control system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic view of an alternating current control system according to a first embodiment of the present disclosure. Referring to FIG. 1, an alternating current (AC) control system A1 includes, for example, a zero crossing detector 1, a microcontroller 2, a switch device 3, an alternating current solid state relay 4, a constant current driver 5, and a light emitting diode LED. The microcontroller 2 is electrically connected to the zero crossing detector 1, the switch device 3 and the constant current driver 5. The constant current driver 5 is electrically connected to the alternating current solid state relay 4 and the microcontroller 2, and the light emitting diode LED is electrically connected to the microcontroller 2.

The alternating current control system A1 is adapted to an alternating current power source AC, and the alternating current power source AC is, for example, 110 volts or 220 volts. The zero crossing detector 1 and the alternating current solid state relay 4 are electrically connected to the alternating current power source AC. The zero crossing detector 1 outputs a zero crossing detection signal ZCD to the microcontroller 2, and the zero crossing detection signal ZCD has a pulse period. When the zero crossing detector 1 detects that an output voltage of the alternating current power source AC is at a zero crossing point, the zero crossing detection signal ZCD is at a high level H1. When the zero crossing detector 1 detects that the output voltage of the alternating current power source AC is not at the zero crossing point, the zero crossing detection signal ZCD is at a low level L1.

Figure 2:
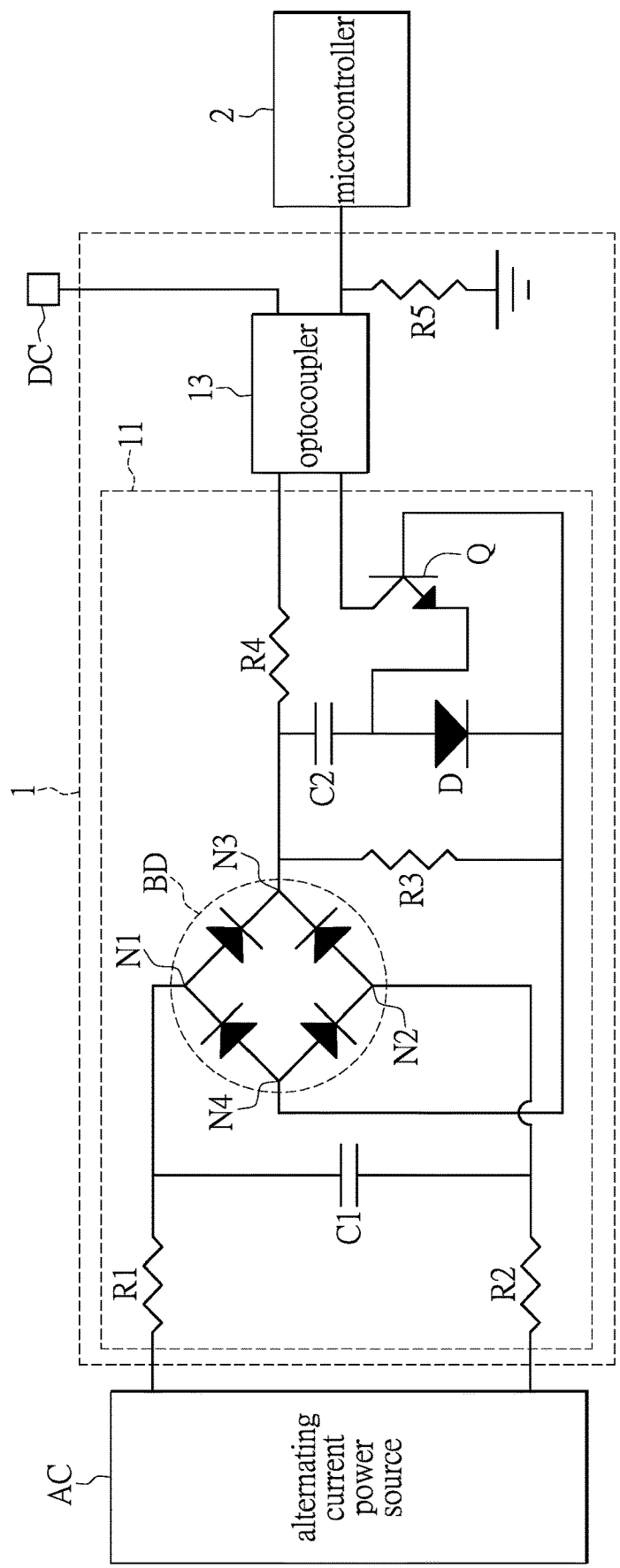
FIG. 2 is a circuit diagram of a zero crossing detector according to one embodiment of the present disclosure.

FIG. 2 is a circuit diagram of a zero crossing detector according to one embodiment of the present disclosure. Referring to FIG. 2, the zero crossing detector 1 includes, for example, an alternating current signal processing circuit 11 and an optocoupler 13, and the alternating current signal processing circuit 11 is connected to the alternating current power source AC. The optocoupler 13 is connected between the alternating current signal processing circuit 11 and the microcontroller 2. The optocoupler 13 is also connected to a direct current power source DC and a resistor R5.

The alternating current signal processing circuit 11 includes, for example, resistors R1-R4, capacitors C1-C2, a bridge rectifier circuit BD, a diode D, and a transistor Q, and the bridge rectifier circuit BD includes four diodes. A first end of the resistor R1 is connected to a first end of the alternating current power source AC, and a second end of the resistor R1 is connected to a first electrode of the capacitor C1 and a node N1 of the bridge rectifier circuit BD. A first end of the resistor R2 is connected to a second end of the alternating current power source AC, and a second end of the resistor R2 is connected to a second electrode of the capacitor C1 and a node N2 of the bridge rectifier circuit BD.

A first end of the resistor R3 is connected to a node N3 of the bridge rectifier circuit BD, and a second end of the resistor R3 is connected to a node N4 of the bridge rectifier circuit BD. A first electrode of the capacitor C2 is connected to a first end of the resistor R4, a second electrode of the capacitor C2 is connected to an anode of the diode D, and a cathode of the diode D is connected to the second end of the resistor R3. A first end of the resistor R4 is connected to the first electrode of the capacitor C2, and a second end of the resistor R4 is connected to the optocoupler 13. The transistor Q is, for example, a bipolar junction transistor (BJT), but the present disclosure is not limited thereto. A collector of the transistor Q is connected to the optocoupler 13, and a base of the transistor Q is connected to the cathode of the diode D, the second end of the resistor R3, and the node N4 of the bridge rectifier circuit BD. An emitter of the transistor Q is connected to the second electrode of the capacitor C2 and the anode of the diode D.

When the alternating current signal processing circuit 11 of the zero crossing detector 1 detects that an alternating voltage of the alternating current power supply AC is at the zero crossing point, the zero crossing detection signal ZCD outputted by the optocoupler 13 of the zero crossing detector 1 is at the high level H1. Conversely, when the alternating current signal processing circuit 11 of the zero crossing detector 1 detects that the alternating voltage of the alternating current power supply AC is not at the zero crossing point, the zero crossing detection signal ZCD outputted by the optocoupler 13 of the zero crossing detector 1 is at the low level L1.

Figure 3A:
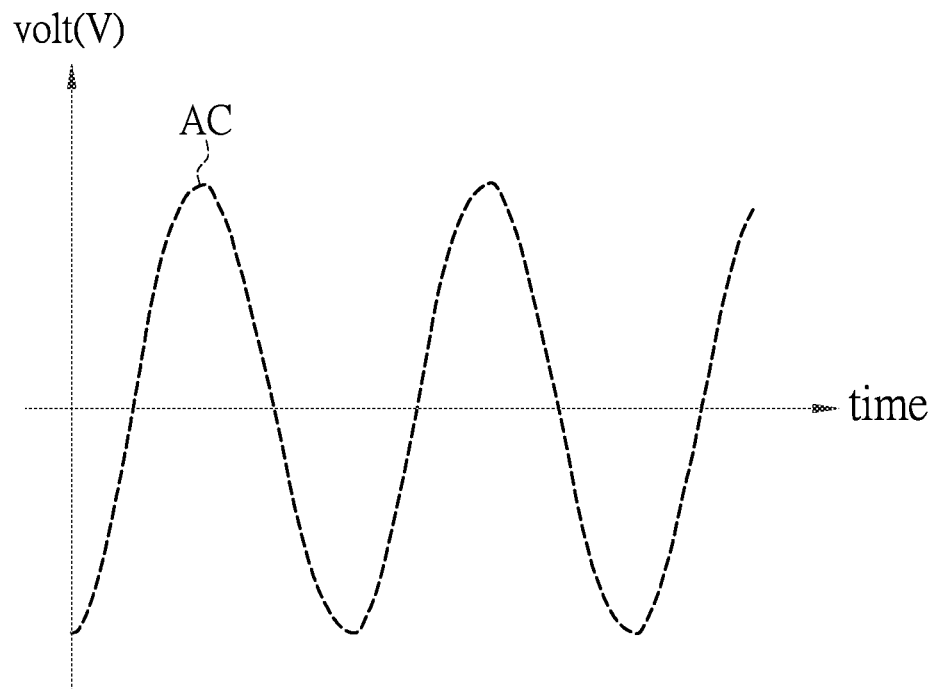
FIG. 3A is a waveform diagram of an alternating current power source detected by the zero crossing detector according to one embodiment of the present disclosure.
Figure 3B:
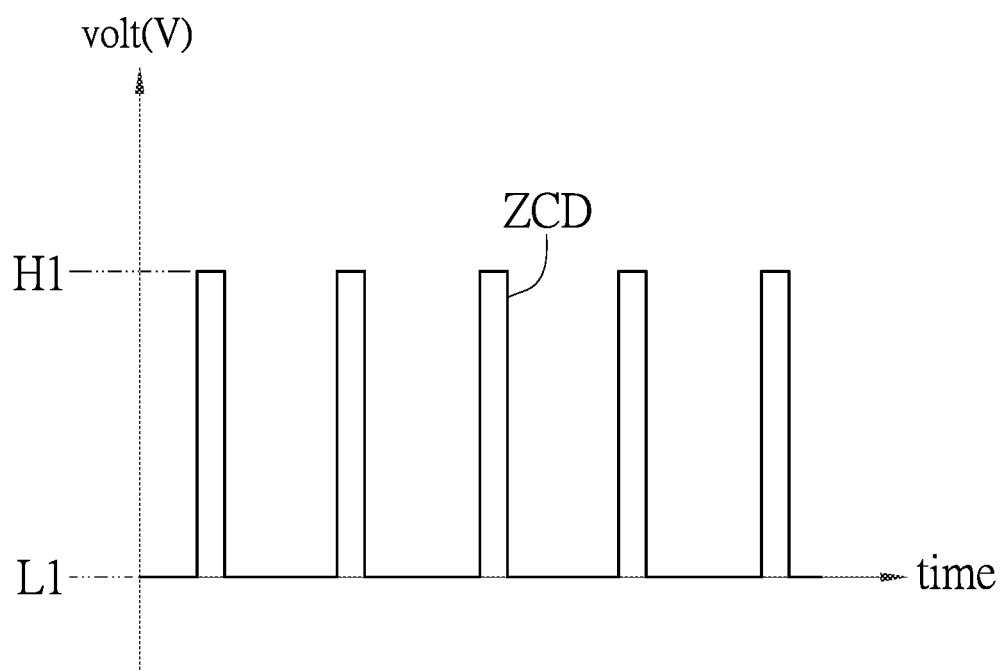
FIG. 3B is a waveform diagram of a zero crossing detection signal that corresponds to the alternating current power source of FIG. 3A according to one embodiment of the present disclosure.

FIG. 3A is a waveform diagram of an alternating current power source detected by the zero crossing detector according to one embodiment of the present disclosure, and FIG. 3B is a waveform diagram of a zero crossing detection signal that corresponds to the alternating current power source of FIG. 3A according to one embodiment of the present disclosure. FIG. 3A shows the alternating voltage of the alternating current power source AC, and FIG. 3B shows the zero crossing detection signal ZCD. When the zero crossing detector 1 detects that the alternating voltage of the alternating current power source AC is at the zero crossing point, the zero crossing detection signal ZCD is at the high level H1. When the zero crossing detector 1 detects that the alternating voltage of the alternating current power source AC is not at the zero crossing point, the zero crossing detection signal ZCD is at the low level L1.

Figure 4:
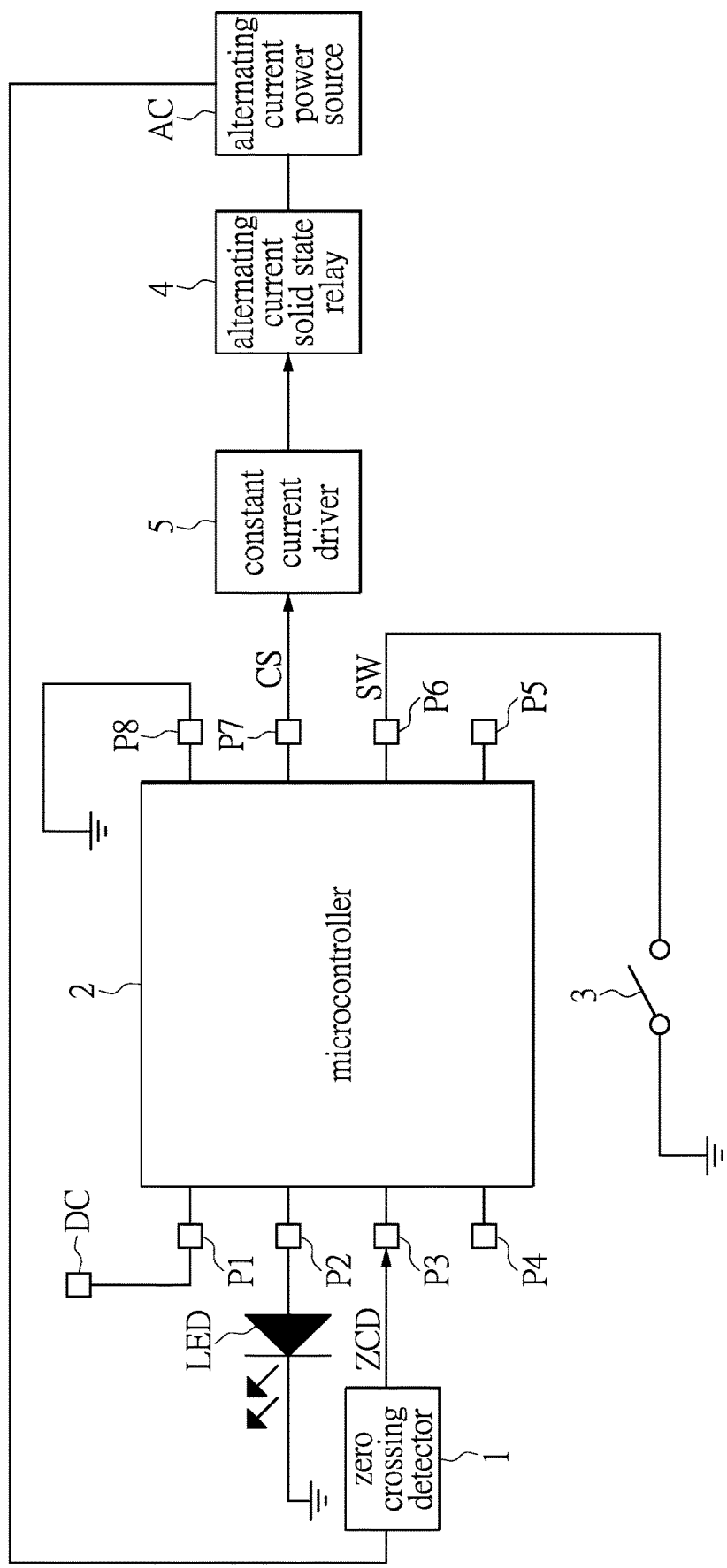
FIG. 4 is a circuit diagram of a microcontroller, a switch device, and relevant elements thereof according to one embodiment of the present disclosure.

FIG. 4 is a circuit diagram of a microcontroller, a switch device, and relevant elements thereof according to one embodiment of the present disclosure. Referring to FIG. 4, the microcontroller 2 includes a plurality of control pins P1-P8. The control pin P1 is connected to the direct current power source DC, the control pin P2 is connected to the light emitting diode LED, and the control pin P3 is connected to the optocoupler 13 of the zero crossing detector 1 for receiving the zero crossing detection signal ZCD from the optocoupler 13. The microcontroller 2 calculates the pulse period of the zero crossing detection signal ZCD. When the microcontroller 2 determines that the pulse period of the zero crossing detection signal ZCD is not within an allowable period range (e.g., from 50 HZ to 60 HZ), the microcontroller 2 enables the light emitting diode LED, so that the light emitting diode LED is in a blinking light state.

The switch device 3 is, for example, a mechanical switch or an electronic switch. The control pin P6 of the microcontroller 2 is connected to the switch device 3. When the switch device 3 is in an open state, a switch state signal SW received by the control pin P6 is at a high level H2. When the switch device 3 is in a closed state, the switch state signal SW received by the control pin P6 is at a low level L2.

In other embodiments of the alternating current control system of the present disclosure, the switch device 3 can be omitted, and the control pin P6 of the microcontroller 2 can receive a control command sent by an external terminal device. The external terminal device is, for example, a mobile communication device or a server.

Figure 5:
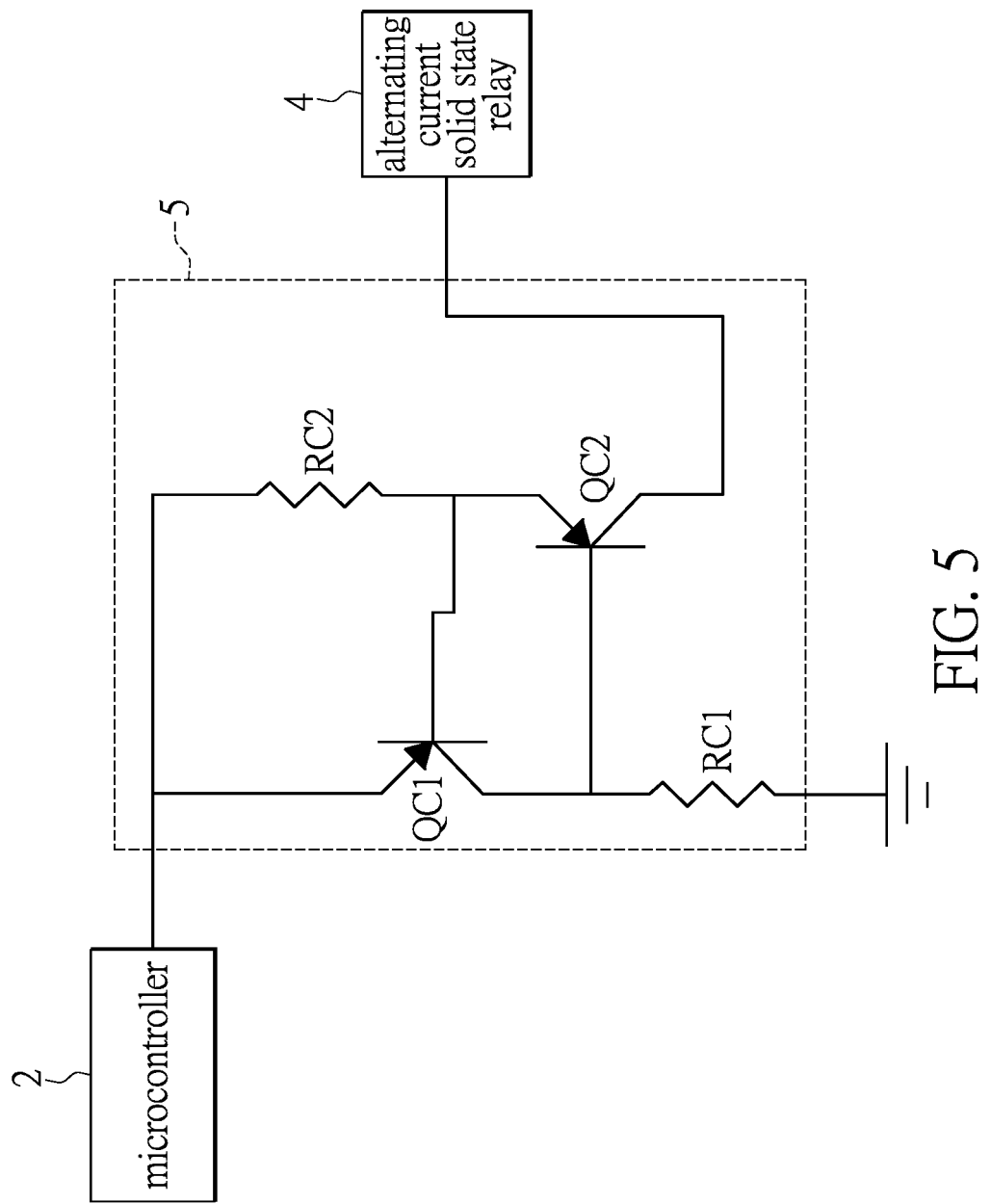
FIG. 5 is a circuit diagram of a constant current driver according to one embodiment of the present disclosure.

FIG. 5 is a circuit diagram of a constant current driver according to one embodiment of the present disclosure. Referring to FIG. 5, the constant current driver 5 includes a transistor QC1, a transistor QC2, a resistor RC1, and a resistor RC2. The control pin P7 of the microcontroller 2 is connected to an emitter of the transistor QC1, so as to accept a control signal CS outputted by the control pin P7 of the microcontroller 2. The emitter of the transistor QC1 is further connected to a first end of the resistor RC2, and a base of the transistor QC1 is connected to a second end of the resistor RC2.

An emitter of the transistor QC2 of the constant current driver 5 is connected to the base of the transistor QC1, a collector of the transistor QC2 is connected to an input end of the alternating current solid state relay 4, and a base of the transistor QC2 is connected to a collector of the transistor QC1. A first end of resistor RC1 is connected to the base of transistor QC2, and the second end of the resistor RC1 is grounded.

When the control signal CS outputted by the control pin P7 of the microcontroller 2 is at a high level H3, the constant current driver 5 outputs a current to the alternating current solid state relay 4 for activating an electrical connection between the alternating current solid state relay 4 and the alternating current power source AC. Conversely, when the control signal CS outputted by the control pin P7 of the microcontroller 2 is at a low level L3, the constant current driver 5 does not output the current to the alternating current solid state relay 4, so as to deactivate the electrical connection between the alternating current solid state relay 4 and the alternating current power source AC.

For example, a resistance of the resistor RC2 is 0.06 kilohms. When a current flowing through the resistor RC2 exceeds 10 mA, a voltage difference between the two ends of the resistor RC2 is 0.6 V. Therefore, the transistor QC1 and the transistor QC2 are in a linear semi-turn-on state, such that the current flowing through the resistor RC2 and the collector of the transistor QC2 connected to the input end of the alternating current solid state relay 4 is limited to being 10 mA.

Conversely, when the current flowing through the resistor RC2 is less than 10 mA (e.g., the current flowing through the resistor RC2 being 9 mA), the voltage difference between the two ends of the resistor RC2 is 0.54 V, the transistor QC1 is turned off, and the transistor QC2 is in between the linear semi-turn-on state and a fully-turn-on state. When the current flowing through the resistor RC2 is increased to exceed 10 mA, the voltage difference between the two ends of the resistor RC2 is 0.6 V, and an automatic closed loop action is repeated. Accordingly, the transistor QC1 is turned on, and the transistor QC2 is in the linear semi-turn-on state. The transistor QC2 is configured as an automatic variable resistor that can automatically limit the current to being 10 mA.

Figure 6:
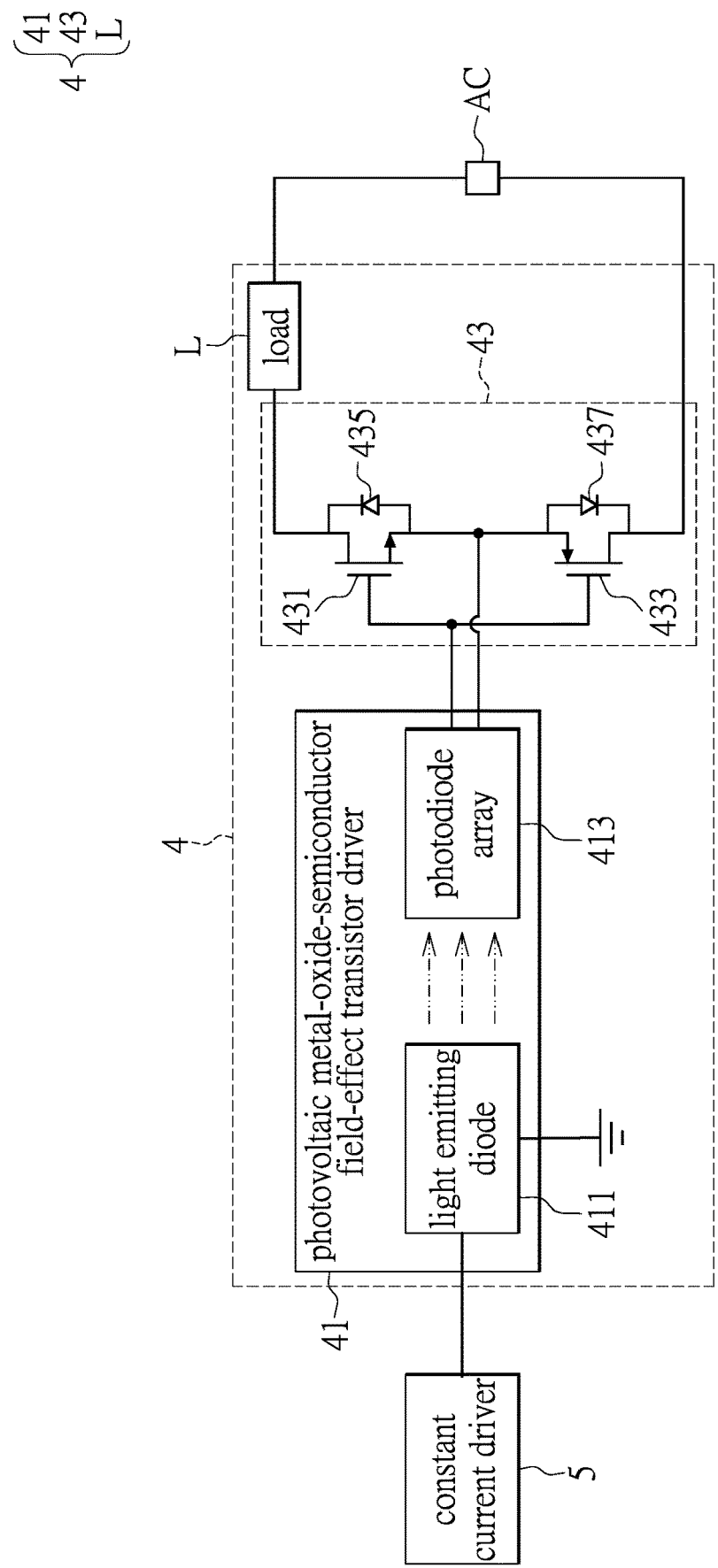
FIG. 6 is a circuit diagram of an alternating current solid state relay according to one embodiment of the present disclosure.

FIG. 6 is a circuit diagram of an alternating current solid state relay according to one embodiment of the present disclosure. Referring to FIG. 6, the alternating current solid state relay 4 includes, for example, a photovoltaic metal-oxide-semiconductor field-effect transistor (MOSFET) driver 41, a power transistor, 43 and a load L. The photovoltaic MOSFET driver 41 includes a light-emitting diode 411 and a photodiode array 413. When the light emitting diode 411 receives the current from the constant current driver 5 and switches from a turn-off state to a turn-on state, the light emitting diode 411 emits a light signal, and then the photodiode array 413 receives the light signal from the light emitting diode 411 and converts the light signal into an electrical signal. Then, the photodiode array 413 outputs a voltage signal to the power transistor 43 for driving the power transistor 43.

The power transistor 43 includes a first field effect transistor 431, a second field effect transistor 433, a first body diode 435, and a second body diode 437. The first field effect transistor 431 and the second field effect transistor 433 are, for example, two N-type metal-oxide-semiconductors (NMOS), but the present disclosure is not limited thereto. A gate of the first field effect transistor 431 is connected to a gate of the second field effect transistor 433, and an anode of the first body diode 435 is connected to a source of the first field effect transistor 431 and a source of the second field effect transistor 433. A cathode of the first body diode 435 is connected to a drain of the first field effect transistor 431 and a first end of the load L, and an anode of the second body diode 437 is connected to the source of the first field effect transistor 431 and the source of the second field effect transistor 433. A cathode of the second body diode 437 is connected to a drain of the second field effect transistor 433 and the first end of the alternating current power source AC. The second end of the alternating current power source AC is connected to a second end of the load L.

Figure 7:
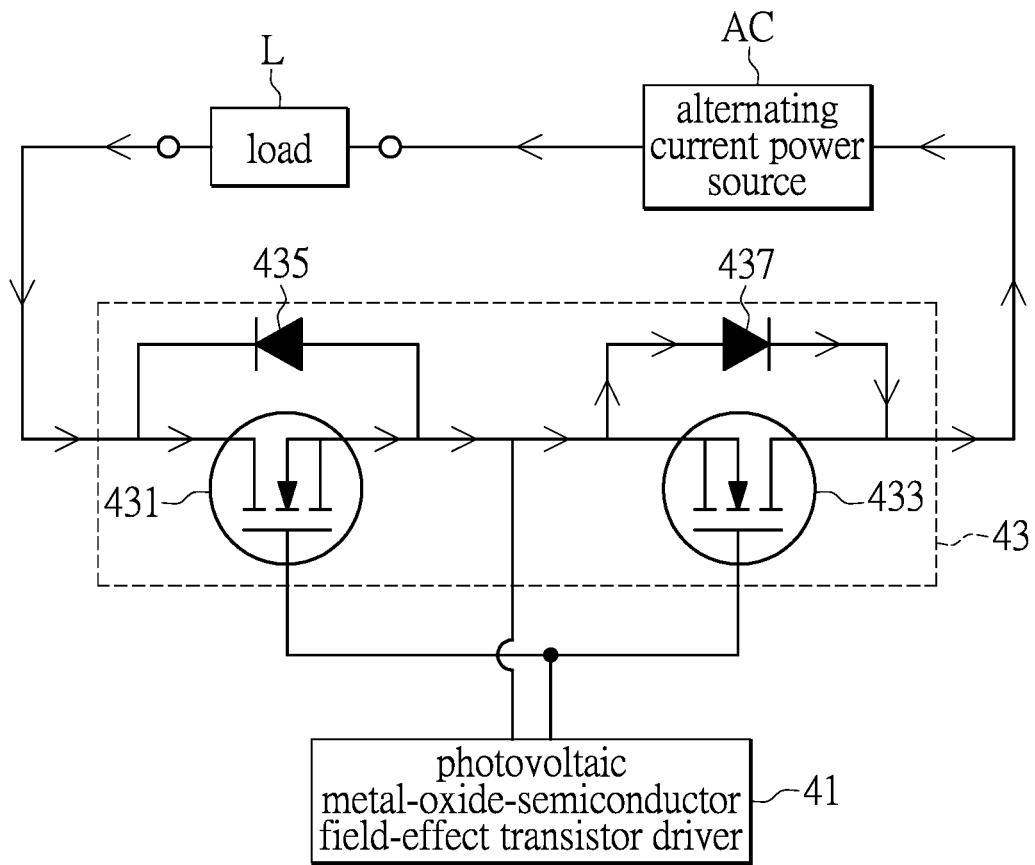
FIG. 7 is a current diagram of a power transistor when the alternating current power source is in a positive half cycle.

FIG. 7 is a current diagram of a power transistor when the alternating current power source is in a positive half cycle. Referring to FIG. 7, when the alternating current power source AC is in the positive half cycle and the electrical connection between the alternating current solid state relay 4 and the alternating current power source AC is activated, the first field effect transistor 431 is turned on and the second field effect transistor 433 is turned off. At this time, the current outputted by the alternating current power source AC sequentially passes through the load L, the drain of the first field effect transistor 431, the source of the first field effect transistor 431, and the second body diode 437, and finally flows to the alternating current power source AC.

Figure 8:
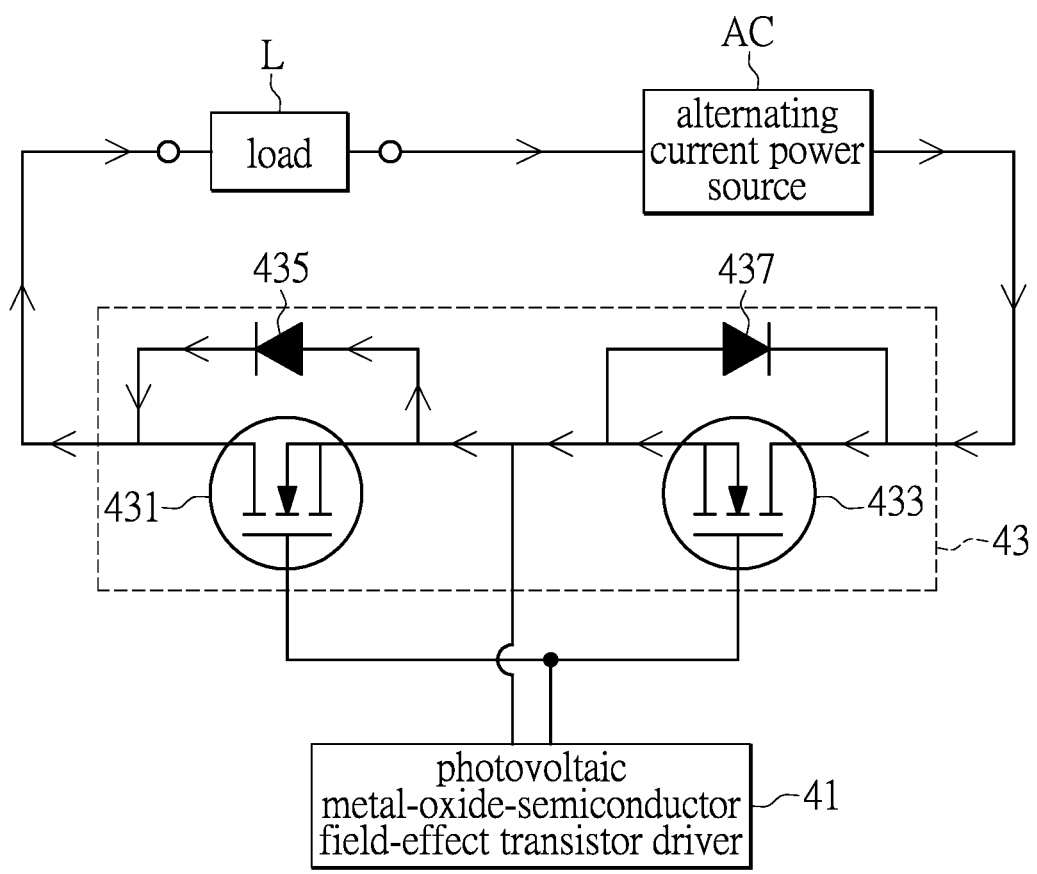
FIG. 8 is a current diagram of the power transistor when the alternating current power source is in a negative half cycle.

FIG. 8 is a current diagram of the power transistor when the alternating current power source is in a negative half cycle. Referring to FIG. 8, when the alternating current power source AC is in the negative half cycle and the electrical connection between the alternating current solid state relay 4 and the alternating current power source AC is activated, the first field effect transistor 431 is turned off and the second field effect transistor 433 is turned on. At this time, the current outputted by the alternating current power source AC sequentially passes through the drain of the second field effect transistor 433, the source of the second field effect transistor 433, the first body diode 435, and the load L, and finally flows to the alternating current power source AC.

Figure 9A:
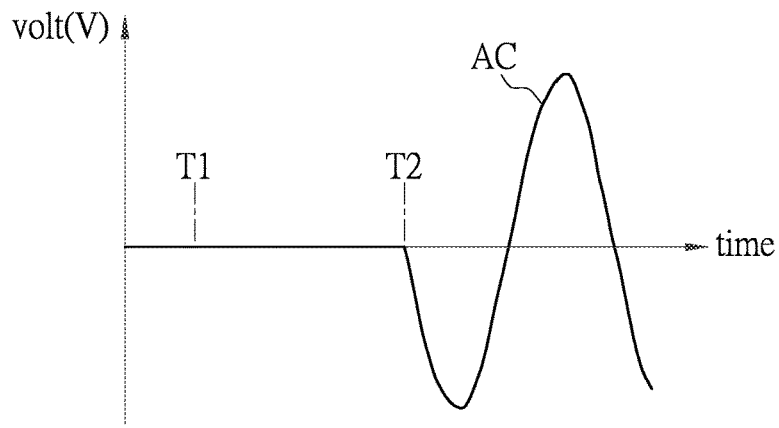
FIG. 9A is a waveform diagram of the alternating current power source on a load.
Figure 9B:
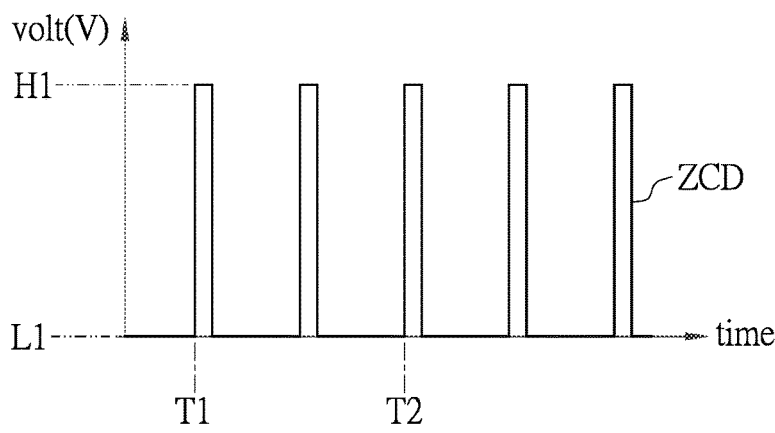
FIG. 9B is a waveform diagram of the zero crossing detection signal according to one embodiment of the present disclosure.
Figure 9C:
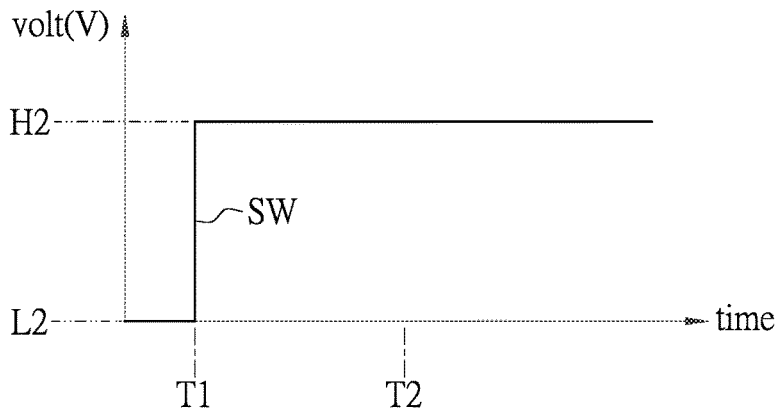
FIG. 9C is a waveform diagram of a switch state signal according to one embodiment of the present disclosure.
Figure 9D:
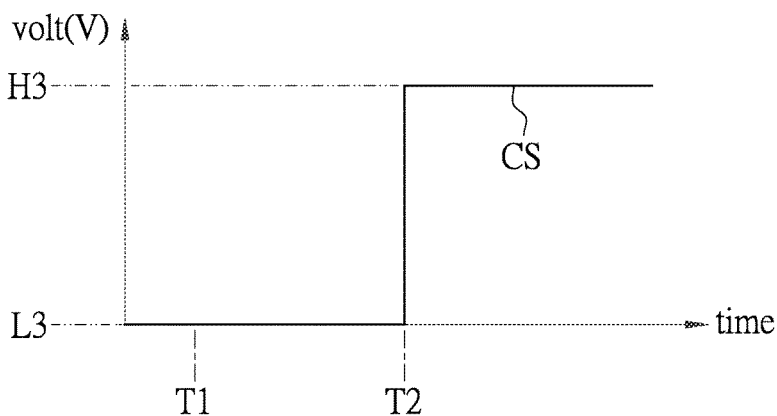
FIG. 9D is a waveform diagram of a control signal according to one embodiment of the present disclosure.

FIG. 9A is a waveform diagram of the alternating current power source on a load, FIG. 9B is a waveform diagram of the zero crossing detection signal according to one embodiment of the present disclosure, FIG. 9C is a waveform diagram of a switch state signal according to one embodiment of the present disclosure, and FIG. 9D is a waveform diagram of a control signal according to one embodiment of the present disclosure. Referring to FIGS. 9A to 9D, before a first time point T1, the switch state signal SW is at the low level L2, the control signal CS is at the low level L3, and the electrical connection between the alternating current solid state relay 4 and the alternating current power source AC is deactivated.

At the first time point T1, the switch state signal SW is switched from the low level L2 to the high level H2.

After the first time point T1 and before a second time point T2, the switch state signal SW is already at the high level H2. Even though the zero crossing detection signal ZCD is at the high level H1, the control signal CS is still at the low level L3, and the electrical connection between the alternating current solid state relay 4 and the alternating current power source AC is still deactivated.

A time difference between the second time point T2 and the first time point T1 is at least one pulse period of the zero crossing detection signal ZCD. The control signal CS is not switched from the low level L3 to the high level H3 until the second time point T2, and the electrical connection between the alternating current solid state relay 4 and the alternating current power source AC is switched from a deactivated state to an activated state at the second time point T2.

Figure 10A:
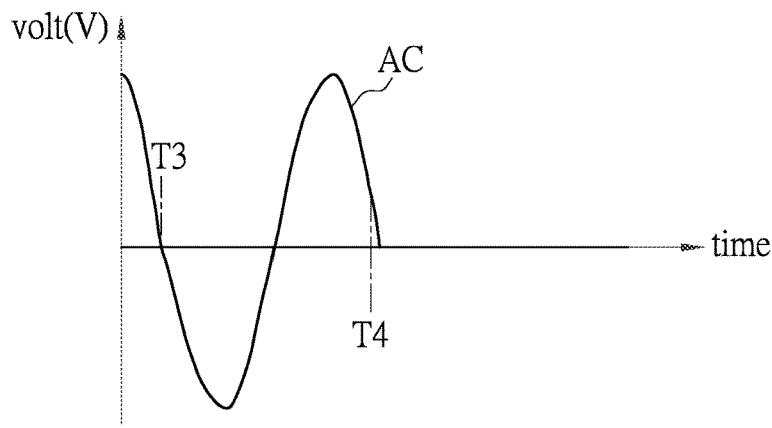
FIG. 10A is another waveform diagram of the alternating current power source on the load.
Figure 10B:
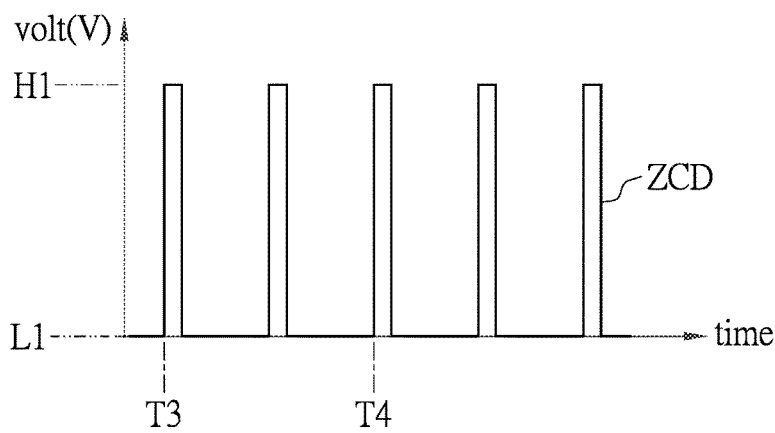
FIG. 10B is a waveform diagram of the zero crossing detection signal according to another embodiment of the present disclosure.
Figure 10C:
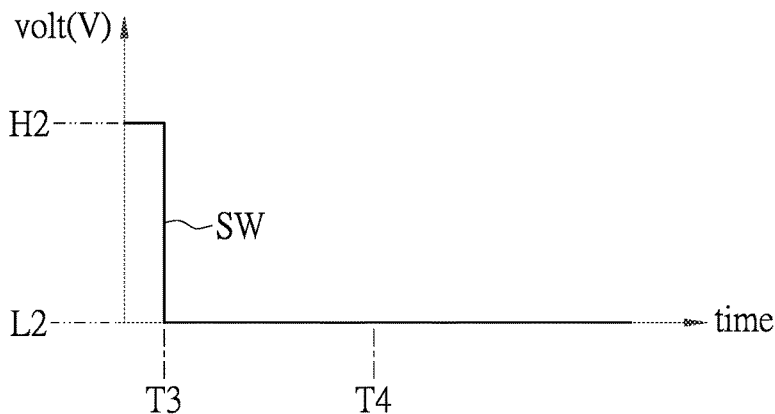
FIG. 10C is a waveform diagram of the switch state signal according to another embodiment of the present disclosure.
Figure 10D:
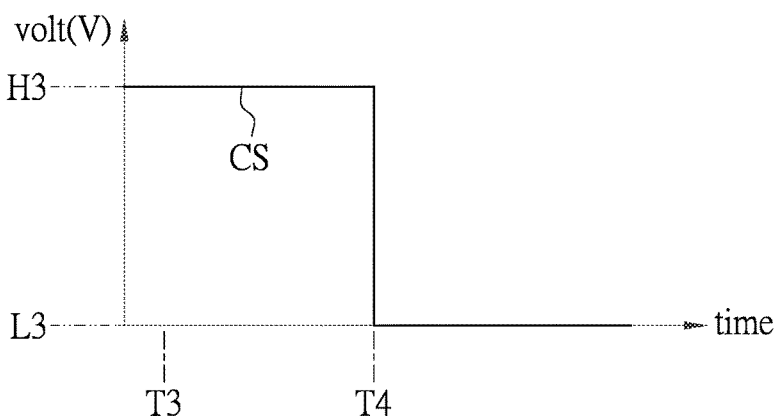
FIG. 10D is a waveform diagram of the control signal according to another embodiment of the present disclosure.

FIG. 10A is another waveform diagram of the alternating current power source on the load, FIG. 10B is a waveform diagram of the zero crossing detection signal according to another embodiment of the present disclosure, FIG. 10C is a waveform diagram of the switch state signal according to another embodiment of the present disclosure, and FIG. 10D is a waveform diagram of the control signal according to another embodiment of the present disclosure. Referring to FIGS. 10A to 10D, before a third time point T3, the switch state signal SW is at the high level H2, the control signal CS is at the high level H3, and the electrical connection between the alternating current solid state relay 4 and the alternating current power source AC is activated.

At the third time point T3, the switch state signal SW is switched from the high level H2 to the low level L2, the control signal CS is at the high level H3, and the electrical connection between the alternating current solid state relay 4 and the alternating current power source AC is still activated.

After the third time point T3 and before a fourth time point T4, the switch state signal SW is at the low level L2, the control signal CS is at the high level H3, and the electrical connection between the alternating current solid state relay 4 and the alternating current power source AC is still activated.

The control signal CS is not switched from the high level H3 to the low level L3 until the fourth time point T4, and a time difference between the fourth time point T4 and the third time point T3 is at least one pulse period of the zero crossing detection signal ZCD. Even if the control signal CS is switched from the high level H3 to the low level L3 at the fourth time point T4, the fourth time point T4 is not necessarily at the zero crossing point of the alternating current power source AC. The voltage of the alternating current power source AC does not suddenly drop to the zero crossing point at the fourth time point T4, and the alternating current power source AC maintains its original frequency for further operation. It is not until the voltage of the alternating current power source AC reaches the zero crossing point that the electrical connection between the alternating current solid state relay 4 and the alternating current power source AC is switched from the activated state to the deactivated state.

Figure 11:
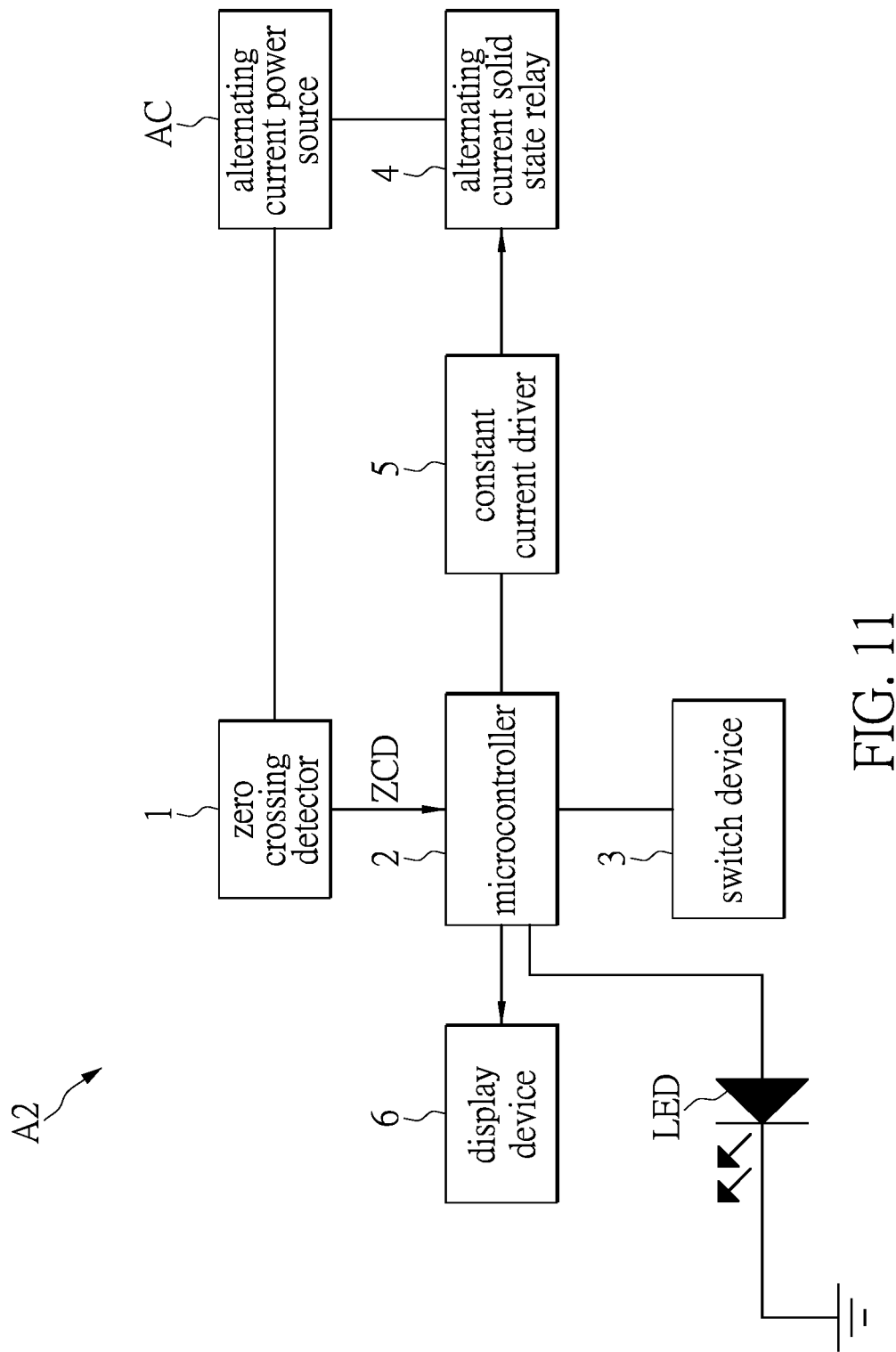
FIG. 11 is a schematic view of the alternating current control system according to a second embodiment of the present disclosure.

FIG. 11 is a schematic view of the alternating current control system according to a second embodiment of the present disclosure. An alternating current control system A2 further includes a display device 6, and the display device 6 is connected to the direct current power source DC and the microcontroller 2. The display device 6 displays multiple pieces of working state information, and the working state information includes working state information of the zero crossing detector 1, working state information of the microcontroller 2, the pulse period of the zero crossing detection signal ZCD, and a working cycle of the alternating current power source AC. According to the working state information displayed on the display device 6, a user can quickly find out whether or not the alternating current control system A2 is abnormal.

Figure 12A:
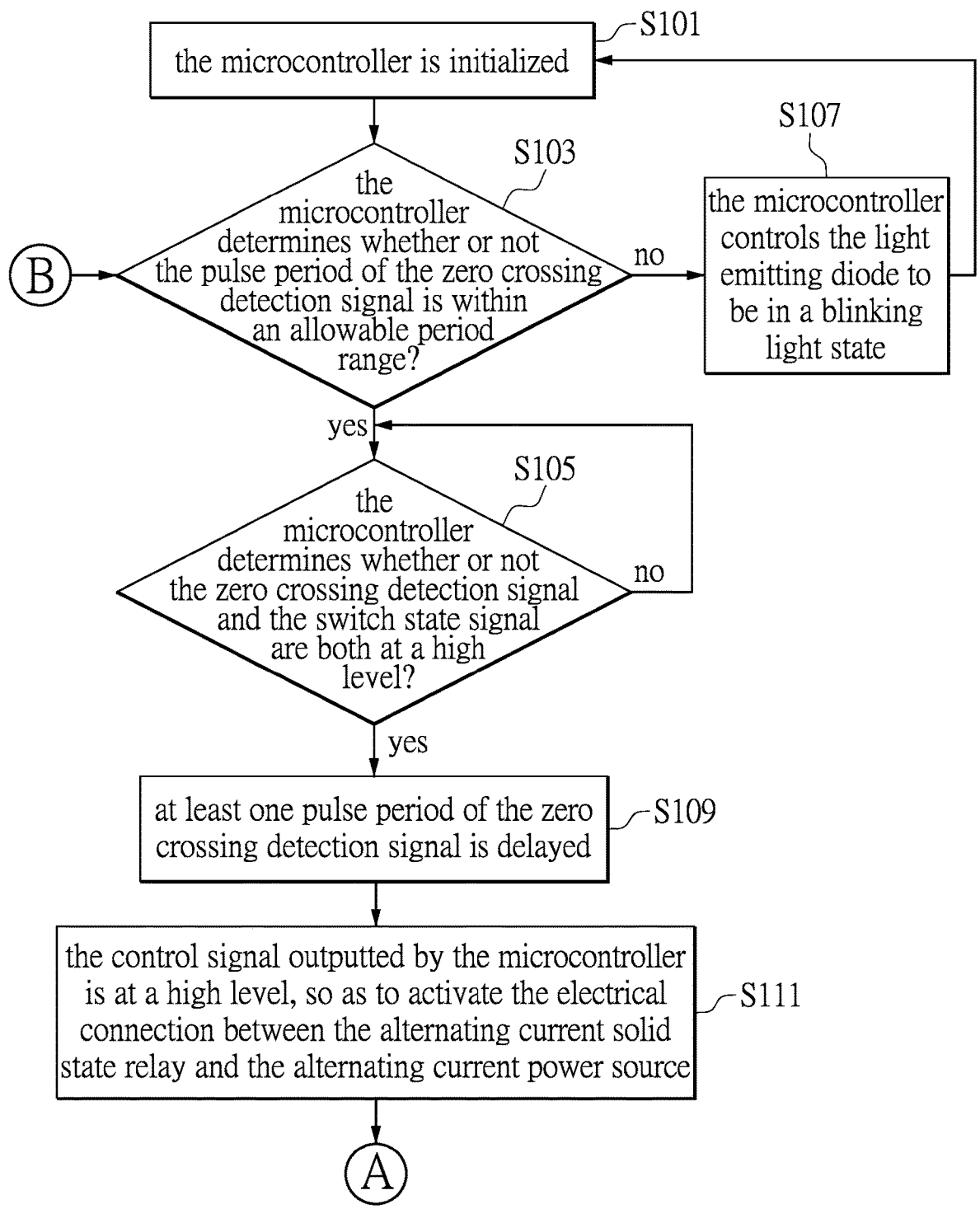
FIG. 12A and FIG. 12B are flowcharts of an operation method of the alternating current control system according to one embodiment of the present disclosure.
Figure 12B:
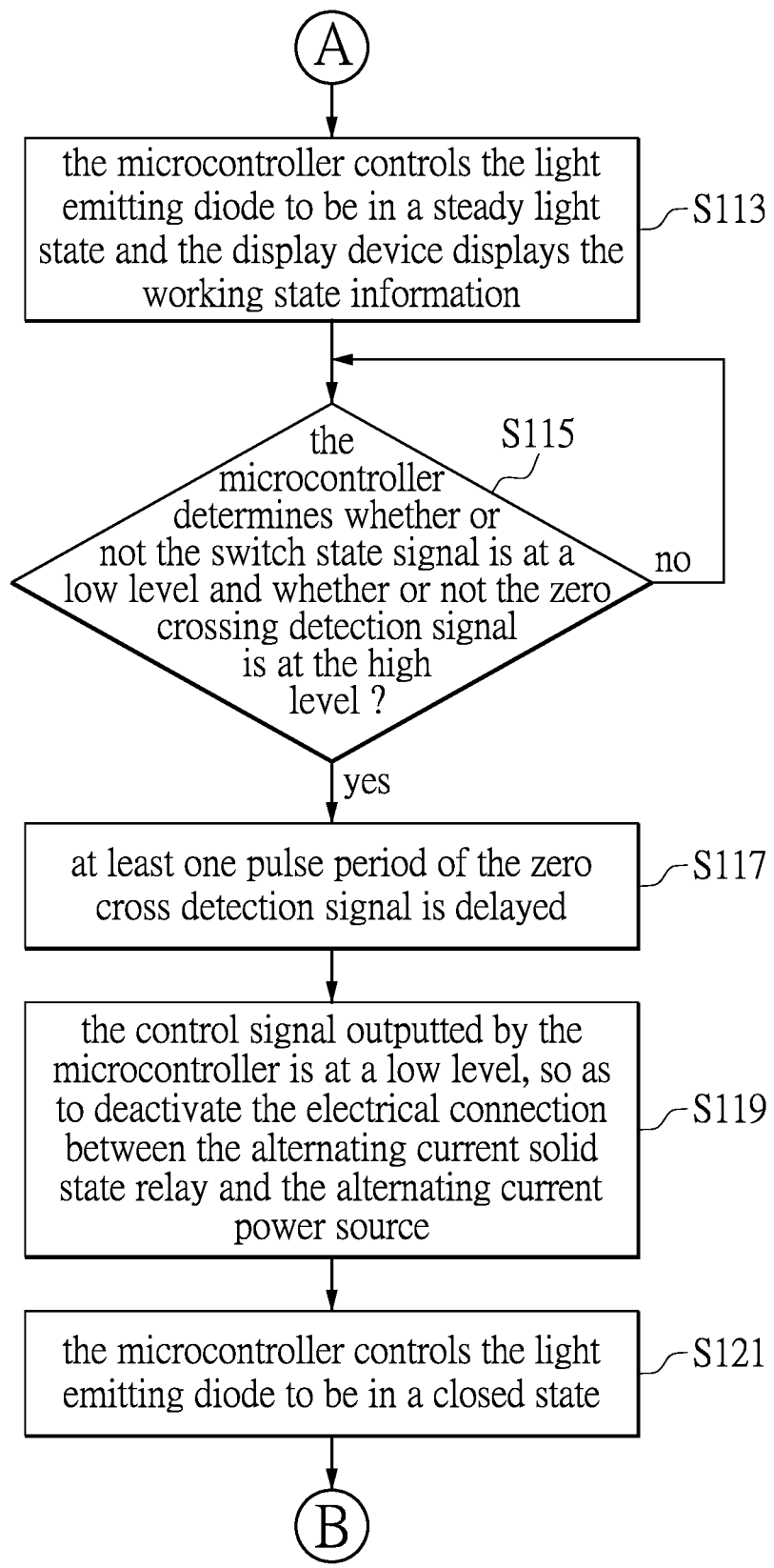

FIG. 12A and FIG. 12B are flowcharts of an operation method of the alternating current control system according to one embodiment of the present disclosure. Referring to FIG. 12A, in step S101, the microcontroller 2 is initialized. The initialization of the microcontroller 2 includes, for example, defining each control pin of the microcontroller 2 as an input pin or an output pin and turning on a backlight of the display device 6 connected to the microcontroller 2.

In step S103, the microcontroller 2 determines whether or not the pulse period of the zero crossing detection signal ZCD is within an allowable period range (e.g., from 50 HZ to 60 HZ). If the pulse period is within the allowable period range, step S103 is followed by step S105. If the pulse period is not within the allowable period range, step S103 is followed by step S107. In step S107, the microcontroller 2 controls the light emitting diode LED to be in a blinking light state, and then the operation method returns to step S101.

In step S105, the microcontroller 2 determines whether or not the zero crossing detection signal ZCD and the switch state signal SW are both at a high level. If the zero crossing detection signal ZCD and the switch state signal SW are both at the high level, step S105 is followed by step S109. If at least one of the zero crossing detection signal ZCD and the switch state signal SW is not at the high level, step S105 is executed again.

In step S109, at least one pulse period of the zero crossing detection signal ZCD is delayed. In step S111, the control signal CS outputted by the microcontroller 2 is at a high level, so as to activate the electrical connection between the alternating current solid state relay 4 and the alternating current power source AC. In step S113, the microcontroller 2 controls the light emitting diode LED to be in a steady light state, and the display device 6 displays the working state information.

In step S115, the microcontroller 2 determines whether or not the switch state signal SW is at a low level and whether or not the zero crossing detection signal ZCD is at the high level. If the switch state signal SW is at the low level and the zero crossing detection signal ZCD is at the high level, step S115 is followed by step S117. If the switch state signal SW is not at the low level or the zero crossing detection signal ZCD is not at the high level, step S115 is executed again.

In step S117, at least one pulse period of the zero crossing detection signal ZCD is delayed. In step S119, the control signal CS outputted by the microcontroller 2 is at a low level, so as to deactivate the electrical connection between the alternating current solid state relay 4 and the alternating current power source AC. In step S121, the microcontroller 2 controls the light emitting diode LED to be in a closed state, and then the operation method returns to step 103.

However, the aforementioned description for the alternating current control system and the operation method of the alternating current control system are merely examples, and are not meant to limit the scope of the present disclosure.

Beneficial Effects of the Embodiments

In conclusion, the alternating current control system provided by the present disclosure can not only accurately detect a zero crossing point of an alternating current signal but also activate or deactivate the electrical connection between the alternating current solid state relay and the alternating current power source based on a level of the switch state signal and a level of the zero crossing detection signal. In this way, when the electrical connection between the alternating current solid state relay and the alternating current power source is activated or deactivated, a large current and a large electromagnetic interference noise will not be easily generated. Further, a power transistor of the alternating current solid state relay is not easily damaged.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An alternating current control system, which is adapted to an alternating current power source, the alternating current control system comprising:
    a zero-crossing detector including an alternating current signal processing circuit and an optocoupler, wherein the alternating current signal processing circuit is electrically connected to the alternating current power source, and the optocoupler is electrically connected to the alternating current signal processing circuit and outputs a zero crossing detection signal;
    a microcontroller including a first control pin, a second control pin, and a third control pin, wherein the first control pin is electrically connected to the optocoupler for receiving the zero crossing detection signal, the second control pin receives a switch state signal, and the third control pin outputs a control signal;
    a constant current driver electrically connected to the third control pin for receiving the control signal;
    an alternating current solid state relay electrically connected between the constant current driver and the alternating current power source; and
    a switch device, connected to the second control pin and configured to output a switch state signal to the second control pin;
    wherein, when the microcontroller determines that the switch device is switched from a closed state to an open state at a first time point according to a change of the switch state signal, the microcontroller activates an electrical connection between the alternating current solid state relay and the alternating current power source at a second time point, wherein the second time point is later than the first time point and a time difference between the second time point and the first time point is at least one pulse period of the zero crossing detection signal;
    wherein, when the microcontroller determines that the switch device is switched from the open state to the closed state at a third time point based on the change of the switch state signal, the microcontroller deactivates the electrical connection between the alternating current solid state relay and the alternating current power source at a fourth time point, wherein the fourth time point is later than the third time point and a time difference between the fourth time point and the third time point is at least one pulse cycle of the zero crossing detection signal.

2. The alternating current control system according to claim 1, wherein the alternating current signal processing circuit includes a first capacitor, a bridge rectifier circuit, a second capacitor, a diode, and a transistor, the bridge rectifier circuit is electrically connected between the first capacitor and the second capacitor, the second capacitor is electrically connected to the optocoupler, the diode is electrically connected to the transistor, and the transistor is electrically connected to the optocoupler.

3. The alternating current control system according to claim 1, wherein the switch state signal is at a high level when the switch device is in the open state, and the switch state signal is at a low level when the switch device is in the closed state.

4. The alternating current control system according to claim 1, wherein the alternating current solid state relay includes a photovoltaic metal-oxide-semiconductor field-effect transistor driver, a power transistor, and a load; wherein, when the photovoltaic metal-oxide-semiconductor field-effect transistor driver receives a current from the constant current driver, the photovoltaic metal-oxide-semiconductor field-effect transistor driver drives the power transistor and the load.

5. The alternating current control system according to claim 4, wherein the power transistor includes a first field effect transistor, a second field effect transistor, a first body diode, and a second body diode; wherein a gate of the first field effect transistor is connected to a gate of the second field effect transistor, an anode of the first body diode is connected to a source of the first field effect transistor and a source of the second field effect transistor, a cathode of the first body diode is connected to a drain of the first field effect transistor and the load, an anode of the second body diode is connected to the source of the first field effect transistor and the source of the second field effect transistor, and a cathode of the second body diode is connected to a drain of the second field effect transistor and the alternating current power source.

6. The alternating current control system according to claim 2, further comprising a display device, wherein the display device is connected to the microcontroller, and the display device is used to display working state information of the zero crossing detector and working state information of the microcontroller.

7. The alternating current control system according to claim 1, further comprising a light emitting diode connected to the microcontroller, wherein, in response to a pulse period of the zero crossing detection signal being not within an allowable period range, the microcontroller controls the light emitting diode to be in a blinking state; wherein, when the control signal outputted by the microcontroller is at a high level for activating the electrical connection between the alternating current solid state relay and the alternating current power source, the microcontroller controls the light emitting diode to be in an on state; wherein, when the control signal outputted by the microcontroller is at a low level for deactivating the electrical connection between the alternating current solid state relay and the alternating current power source, the microcontroller controls the light emitting diode to be in an off state.

* * * * *